(12) United States Patent
Fujimori et al.

(10) Patent No.: US 10,979,987 B2
(45) Date of Patent: Apr. 13, 2021

(54) SENSOR SYSTEM FOR COLLECTING DATA USING AN ENCRYPTION KEY

(71) Applicant: Hitachi, Ltd., Tokyo (JP)

(72) Inventors: Tsukasa Fujimori, Tokyo (JP); Masatoshi Morishita, Tokyo (JP); Yasuyuki Okuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/523,552

(22) Filed: Jul. 26, 2019

(65) Prior Publication Data

US 2020/0037272 A1    Jan. 30, 2020

(30) Foreign Application Priority Data

Jul. 30, 2018 (JP) .............................. JP2018-142430

(51) Int. Cl.
*H04W 52/44* (2009.01)
*H04W 4/38* (2018.01)
*H04L 9/08* (2006.01)
*H04L 9/32* (2006.01)

(52) U.S. Cl.
CPC ........... *H04W 52/44* (2013.01); *H04L 9/0894* (2013.01); *H04L 9/3242* (2013.01); *H04W 4/38* (2018.02); *H04L 2209/805* (2013.01)

(58) Field of Classification Search
CPC ........... H04W 4/70; H04W 4/02; H04W 4/38; H04W 4/80; H04W 12/00; H04W 12/001; H04W 12/0609; H04W 52/02; H04W 52/44; H04L 2209/80; H04L 2209/805; H04L 9/0891; H04L 9/0894; H04L 9/3242

See application file for complete search history.

(56) References Cited

U.S. PATENT DOCUMENTS

2011/0022851 A1* 1/2011 Yokota ................. H04L 9/0894
713/189
2018/0272087 A1* 9/2018 Von Blumenthal .... G16H 20/40
2018/0284758 A1* 10/2018 Cella .................. G05B 19/4185

FOREIGN PATENT DOCUMENTS

JP      2018-18202 A     2/2018
WO  WO 2009/119079 A1   10/2009

* cited by examiner

*Primary Examiner* — Philip Sobutka
(74) *Attorney, Agent, or Firm* — Crowell & Moring LLP

(57) ABSTRACT

According to one embodiment, a sensor system includes a sensor node that collects data; and a data collection apparatus that is wirelessly connected to the sensor node. The sensor node encrypts the sensor data measured by the sensor device using the received encryption key according to the received measurement parameter and transmits the encrypted sensor data to the data collection apparatus. The data collection apparatus decrypts the sensor data received from the sensor node, stores the decrypted sensor data in a storage unit when the sensor data is normally decrypted, and discards non-decrypted sensor data and transmits the measurement parameter and the encryption key to the sensor node when the sensor data is not normally decrypted.

10 Claims, 3 Drawing Sheets

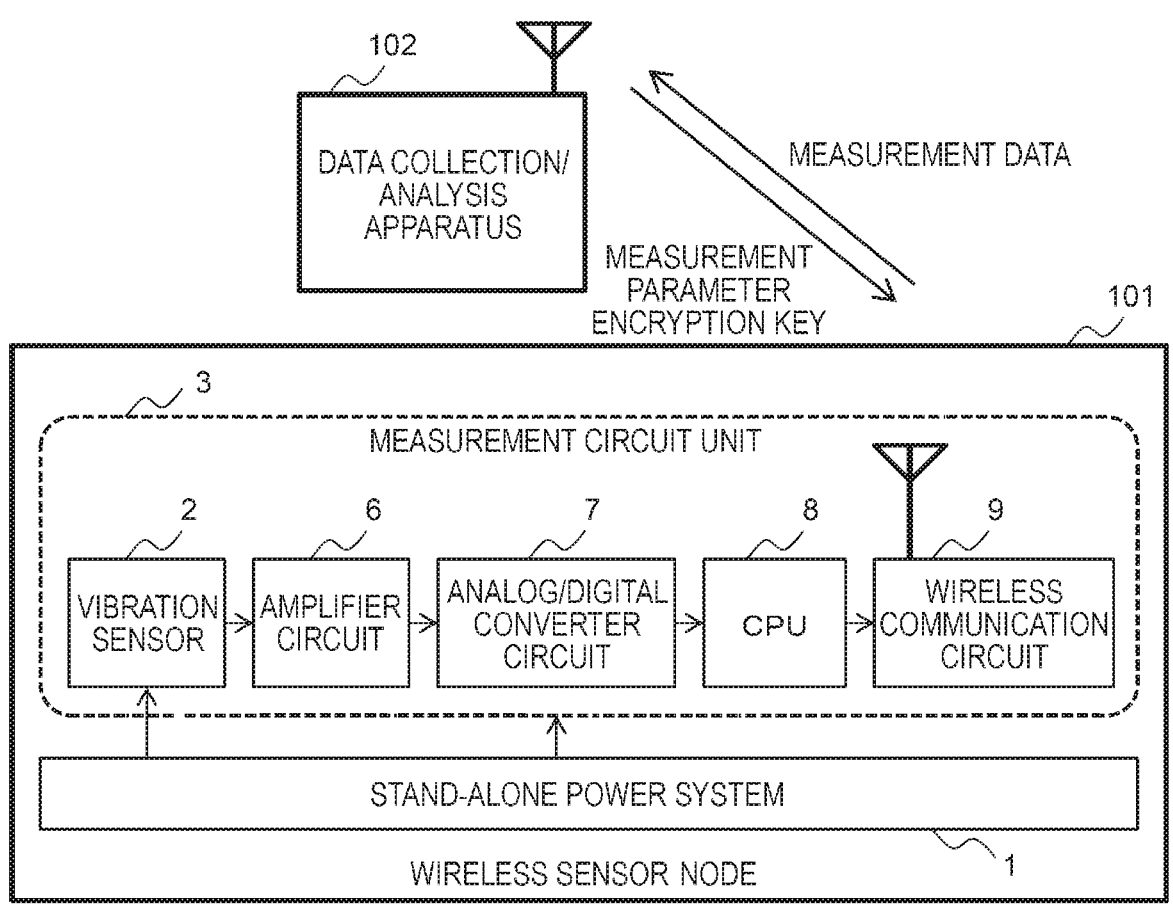

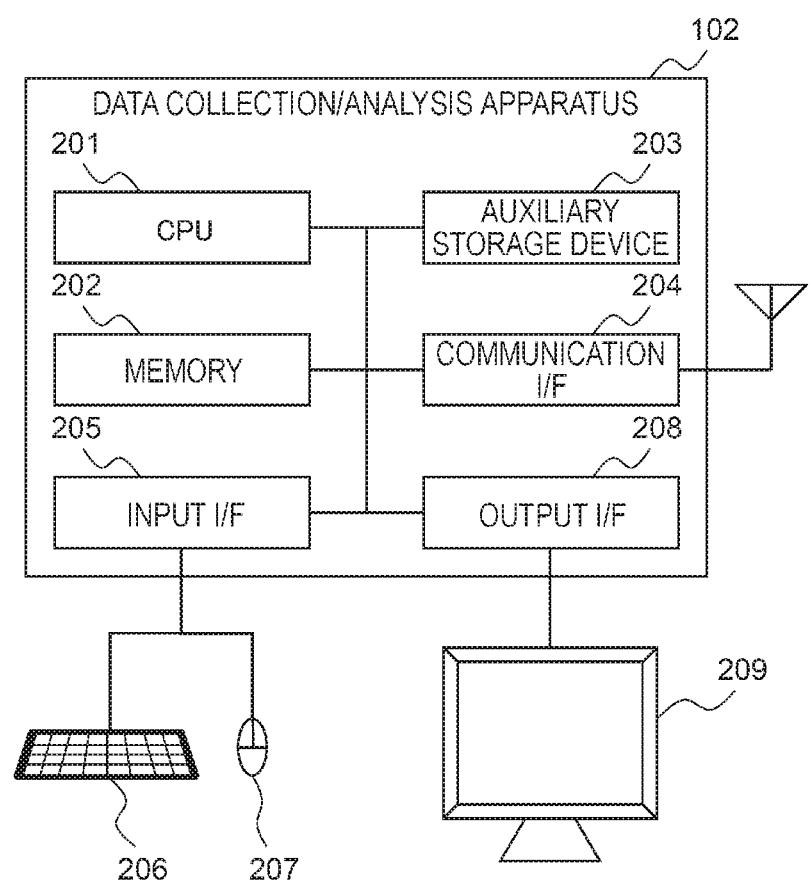

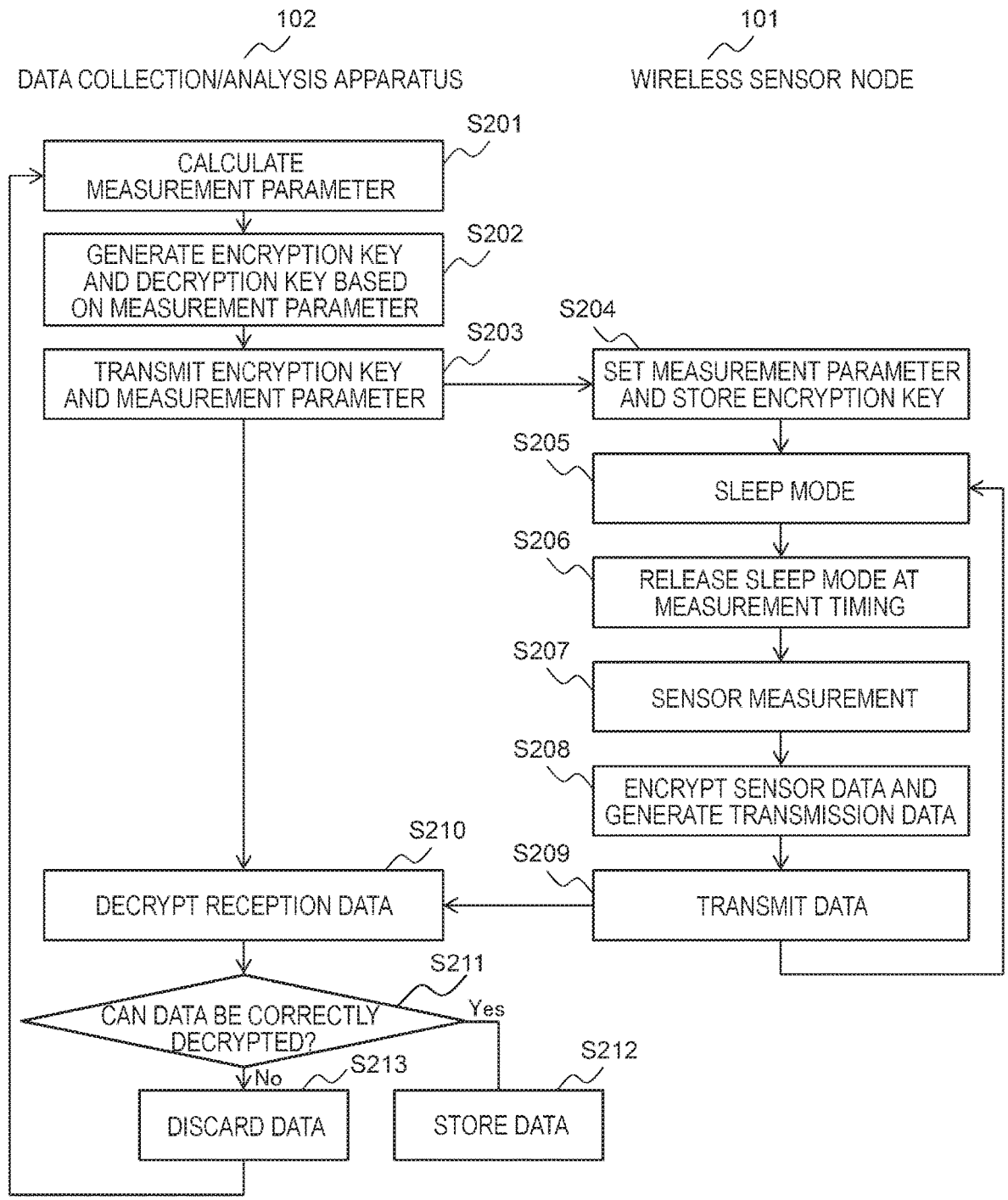

SENSOR SYSTEM FOR COLLECTING DATA USING AN ENCRYPTION KEY

CLAIM OF PRIORITY

The present application claims priority from Japanese patent application JP 2018-142430 filed on Jul. 30, 2018, the content of which is hereby incorporated by reference into this application.

BACKGROUND OF THE INVENTION

1. Field of the Invention

The present invention relates to a sensor system.

2. Description of Related Art

As a background art in this technical field, there are disclosed in the following techniques of the related art. WO 2009/119079 describes a portable data sensor tag including: a memory; a data communication circuit that receives a wireless activation signal from an external terminal, receives an encryption key from the external terminal when operating using an electromotive force generated by the received activation signal, and stores the received encryption key in the memory; a power supply that supplies power; an insulator that switches the supply of power from the power supply from an OFF state to an ON state; and a sensor circuit that operates using power supplied from the power supply after the switching of the supply of power to an ON state, reads the encryption key from the memory, encrypts measurement data using the read encryption key, and stores the encrypted measurement data in the memory. This data sensor tag executes encryption in a state where there is a restriction on the power supply.

In addition, JP-A-2018-18202 describes a wireless sensor node including: a sensor that converts a physical quantity into an electric signal and measures the converted electric signal; an amplifier circuit that amplifies the electric signal; a wireless communication device that wirelessly transmits data based on the signal amplified by the amplifier circuit and receives a command wirelessly transmitted from an external device; and a controller that controls a parameter of the amplifier circuit based on the command.

In a wireless sensor network system, frequent two-way communication is difficult due to a restriction on power consumption of a sensor node. In addition, even in one-way communication from a sensor node, it is desired to restrict the traffic amount per communication to about 100 bytes and to restrict the communication frequency to about once per several minutes. That is, in a wireless sensor network system, it is required that measurement data having as short texts as possible is collected from a sensor node with as low power as possible to update the measurement parameter of the sensor node.

In addition, a sensor node uses a power supply employing energy harvesting in many cases, and thus the power supply is unstable. Therefore, whether or not power is normally supplied to the sensor node, that is, whether or not the sensor node operates is not clear. For example, a sensor node that operates using a battery is not configured to voluntarily restart after the battery is dead.

In a system that transmits a command (for example, a command to update a measurement parameter) from a higher-level apparatus to a sensor node to control the operation of the sensor node, the communication path is unstable. Therefore, the sensor node may not operate according to the transmitted command. Thus, it is necessary to check whether or not the command (measurement parameter) transmitted to the sensor node is stored to improve the reliability of the system such that the sensor node executes a measuring operation according to the transmitted command. However, although there is a method of setting or checking a measurement parameter in response to data request, it is desirable that the frequency of state checking or measurement trigger transmission between the sensor node and the higher-level apparatus is low due to a restriction on power consumption.

Further, when unauthorized data is collected by interception of sensor data transmitted from a sensor node, operation data of a factory may leak. In addition, when unauthorized data is collected by impersonation of a sensor node, there may be an influence on the control of a device.

WO 2009/119079 discloses the technique relating to an RF tag and does not consider a change in measurement parameter or a periodic change in encryption key. In addition, JP-A-2018-18202 does not consider data encryption and the checking of setting of a measurement parameter.

SUMMARY OF THE INVENTION

A representative example of the present invention disclosed in the present application is as follows. That is, there is provided a sensor system that collects data, the sensor system including: a sensor node that collects data; and a data collection apparatus that is wirelessly connected to the sensor node. The sensor node includes a sensor device that measures a physical quantity, a controller that encrypts sensor data measured by the sensor device, and a communication unit that transmits and receives data to and from the data collection apparatus. The data collection apparatus includes an arithmetic unit that executes a process in a predetermined order, a storage unit that is connected to the arithmetic unit, and a communication unit that transmits and receives data to and from the sensor node. The data collection apparatus generates an encryption key using a measurement parameter set in the sensor node and transmits the measurement parameter and the generated encryption key to the sensor node. The sensor node encrypts the sensor data measured by the sensor device using the received encryption key according to the received measurement parameter and transmits the encrypted sensor data to the data collection apparatus. The data collection apparatus decrypts the sensor data received from the sensor node, stores the decrypted sensor data in the storage unit when the sensor data is normally decrypted, and discards non-decrypted sensor data and transmits the measurement parameter and the encryption key to the sensor node when the sensor data is not normally decrypted.

According to one aspect of the present invention, the measurement parameter can be reliably changed while reducing the power consumption of the sensor node. Objects, configurations, and effects other than those described above will be clarified by describing the following embodiments.

BRIEF DESCRIPTION OF THE DRAWINGS

FIG. 1 is a diagram illustrating a configuration example of a sensor system according to an embodiment of the present invention;

FIG. 2 is a block diagram illustrating a physical configuration of a data collection/analysis apparatus according to the embodiment; and FIG. 3 is a flowchart illustrating an operation of the sensor system according to the embodiment.

DESCRIPTION OF EMBODIMENTS

FIG. 1 is a diagram illustrating a configuration example of a sensor system according to an embodiment of the present invention.

The sensor system according to the embodiment includes a wireless sensor node 101 and a data collection/analysis apparatus 102 that are wirelessly connected to each other. The sensor system may have a configuration in which a plurality of wireless sensor nodes 101 is connected to one data collection/analysis apparatus 102. Hereinafter, for simplification, the operation of only one of the wireless sensor nodes 101 will be described. However, the wireless sensor nodes 101 execute the same operation.

The wireless sensor node 101 includes a stand-alone power system 1 and implements a sensor function by operating a measurement circuit unit 3 using power generated by the stand-alone power system 1. The sensor function is a function of measuring various surrounding physical quantities and wirelessly transmitting the measured result to the data collection/analysis apparatus 102. Here, "measurement" refers to all the processes of preparing data to be transmitted by the wireless sensor node 101 once. In the embodiment, an example in which a vibration sensor 2 of the wireless sensor node 101 attached to a factory facility measures vibration of the factory facility will be described. However, the wireless sensor node 101 may include other kinds of sensors (for example, temperature, brightness, or current).

Since the wireless sensor node 101 can be provided in various places, it may be difficult to secure a line for supplying power. Therefore, the stand-alone power system 1 employs energy harvesting capable of supplying power to the measurement circuit unit 3 without supplying power from the outside of the wireless sensor node 101. For example, the stand-alone power system 1 includes a power generation element such as a solar battery that generates power using light, a piezoelectric element that generates power using vibration energy, a Peltier element that generates power using thermal energy, or cranked power generation that generates power using a leakage field from an electric wire and/or a power storage element such as a battery, a power supply control circuit, a rectifier circuit, and the like.

The measurement circuit unit 3 includes the vibration sensor 2, an amplifier circuit 6, an analog/digital converter circuit 7, a processor 8, and a wireless communication circuit 9. The measurement circuit unit 3 rectifies an output signal of the vibration sensor 2, converts the rectified signal into a digital value, and wirelessly transmits the digital value to the data collection/analysis apparatus 102 as measurement data.

The vibration sensor 2 is an element that converts vibration of a measurement target into an electric signal and outputs a voltage or the like corresponding to the amplitude of the vibration. As the vibration sensor 2, a sensor element generally used for measuring vibration, for example, a piezoelectric vibration sensor or a MEMS acceleration sensor can be used. In addition, for example, a microphone that measures sound waves generated along vibration may be used. The bandwidth of vibration to be measured varies depending on the measurement target, and an appropriate sensor is selected and used. In the embodiment, a sensor that measures vibration in a bandwidth of about 10 Hz to 100 kHz and outputs a voltage in proportion to the amplitude of vibration may be used.

The amplifier circuit 6 is a circuit that amplifies a signal input from the vibration sensor 2. The amplifier circuit 6 has a function of being controlled by the processor 8 to change at least one of an amplification factor, an offset voltage used as a reference of amplification, and a slew rate. In addition, a plurality of amplifier circuits that are different from each other in at least one of an amplification factor, an offset voltage, and a slew rate may be switched by control from the processor 8. The slew rate is a parameter relating to the followability of a signal and regulates a frequency band of a signal to be handled by the amplifier circuit. By increasing the slew rate, a signal in a wide frequency band can be detected, but the power consumption increases. Therefore, by reducing the amplification factor, an increase in total power consumption can be suppressed.

The analog/digital converter circuit 7 is a circuit that converts an input signal from the amplifier circuit 6 into a digital signal. Optionally, an appropriate filter circuit may be inserted between the amplifier circuit 6 and the analog/digital converter circuit 7 to suppress noise of an analog signal. The analog/digital converter circuit 7 may be configured to be included in the processor 8. A sampling frequency of the analog/digital converter circuit 7 may be high to be capable of spectral analysis of vibration. In the embodiment, the vibration sensor 2 can execute measurement up to 100 kHz, and thus executes sampling at 1 MHz.

The processor 8 generates and outputs measurement data to be transmitted to the data collection/analysis apparatus 102 through the wireless communication circuit 9, and controls an operation of each block of the vibration sensor 2 and the measurement circuit unit 3 based on the signal received from the data collection/analysis apparatus 102. The processor 8 is an arithmetic device that executes a program stored in a memory and may include a memory (not illustrated) for storing data or the like. Some processes that are executed by the processor 8 executing programs may be executed by another arithmetic device (for example, hardware such as Field Programmable Gate Array (FPGA) or Application Specific Integrated Circuit (ASIC)).

The wireless communication circuit 9 is a circuit that wirelessly transmits a signal from the processor 8 and receives a radio signal transmitted from the data collection/analysis apparatus 102 and, in particular, can adopt various radio frequencies or wireless techniques. For example, a wireless technique according to a standard such as Wi-SUN (registered trademark), Zigbee (registered trademark), WiFi (registered trademark), WirelessHART (registered trademark), or Bluetooth (registered trademark) that is generally used in a sensor system can be used. In addition, communication may be executed using a unique protocol.

The data collection/analysis apparatus 102 has a function of receiving the measurement data transmitted from the wireless sensor node 101 and storing the received data. Further, the data collection/analysis apparatus 102 has a function of analyzing the stored measurement data, determining a measurement parameter based on the analysis result, and wirelessly transmitting the determined measurement parameter to the wireless sensor node 101. The transmission of the measurement parameter from the data collection/analysis apparatus 102 will be described below with reference to FIG. 3.

The measurement parameter is a command for the processor 8 and may include, for example, information (for example, a parameter such as ON/OFF of the amplifier circuit 6, an amplification factor to be set, or an offset voltage) representing the setting of the amplifier circuit 6 of the wireless sensor node 101.

FIG. 2 is a block diagram illustrating a physical configuration of the data collection/analysis apparatus 102 according to the embodiment.

The data collection/analysis apparatus 102 according to the embodiment is configured with a computer including a processor (CPU) 201, a memory 202, an auxiliary storage device 203, a communication interface 204, an input interface 205, and an output interface 208.

The processor 201 is an arithmetic device that executes a program stored in the memory 202. The processor 201 implements various functions of the data collection/analysis apparatus 102 by executing various programs. Some processes that are executed by the processor 201 executing programs may be executed by another arithmetic device (for example, Field Programmable Gate Array (FPGA) or Application Specific Integrated Circuit (ASIC)).

The memory 202 includes a ROM as a non-volatile memory element and a RAM as a volatile memory element. The ROM stores an invariable program (for example, BIOS) or the like. The RAM is a high-speed and volatile memory element such as a Dynamic Random Access Memory (DRAM), and temporarily stores the program to be executed by the processor 201 and data to be used during the execution of the program.

The auxiliary storage device 203 is a high-capacity and a non-volatile storage device such as a magnetic storage device (HDD) or a flash memory (SSD). In addition, the auxiliary storage device 203 stores the data used by the program 201 during the execution of the program and the program to be executed by the processor 201. That is, the program is read from the auxiliary storage device 203, is loaded to the memory 202, and is executed by the processor 201 to implement various functions of the data collection/analysis apparatus 102.

The communication interface 204 is a network interface device that controls communication with another device in accordance with a predetermined protocol. That is, the communication interface 204 may include a wireless communication interface that communicates with the wireless sensor node 101 and a wired communication interface that communicates with another device.

The input interface 205 is an interface to which an input device such as a keyboard 206 or a mouse 207 is connected and that receives an input from an operator. The output interface 208 is an interface to which an output device such as a display device 209 or a printer (not illustrated) is connected and that outputs the execution result of the program in a form that is recognizable by the operator. A terminal that is connected to the data collection/analysis apparatus 102 through a network may provide an input device and an output device.

The program to be executed by the processor 201 is provided to the data collection/analysis apparatus 102 through a removable medium (for example, a CD-ROM or a flash memory) or a network, and is stored in the non-volatile auxiliary storage device 203 as a non-transitory storage medium. Therefore, the data collection/analysis apparatus 102 may include an interface that reads data from the removable medium.

The data collection/analysis apparatus 102 is a computer system on one computer that is physically configured or on a plurality of computers that are logically or physically configured, and may operate on a virtual computer that is constructed on a plurality of physical computer resources.

The data collection/analysis apparatus 102 can be configured as described above by adding a communication interface to a computer or may be configured with dedicated hardware.

FIG. 3 is a flowchart illustrating an operation of the sensor system according to the embodiment. Hereinafter, an operation of each of the wireless sensor node 101 and the data collection/analysis apparatus 102 will be sequentially described with reference to FIG. 3.

The data collection/analysis apparatus 102 calculates a measurement parameter based on the received data (S201).

In the embodiment, the measurement parameter of the wireless sensor node 101 varies depending on the sensor data. For example, in an initial state, high-accuracy detection is necessary in order to measure an unknown signal, and the amplifier circuit 6 is set to have a high amplification factor, a low offset voltage, and a high slew rate for high-accuracy detection. At this time, the frequency of measurement and data transmission is set to be low such that power capable of being supplied from the stand-alone power system 1 is not exceeded (for example, about once per hour).

Next, the wireless sensor node 101 may restrict the frequency band to a frequency band required for the measurement of vibration data and may set the slew rate to be lower than that of the initial state in accordance with an instruction from the data collection/analysis apparatus 102. As a result, the current consumption is reduced and the amplification factor increases due to an excess amount of power consumption such that a weak signal can also be measured or the measurement frequency may be increased.

In addition to the above-described setting, the measurement parameter may be changed, for example, at a timing at which detailed data such as a season, an ambient temperature, a time (day or night), or the time of occurrence of an event is desired to be obtained. In the sensor system according to the example, the measurement parameter is changed at the above-described timing, and an encryption key is changed at the timing. Therefore, the confidentiality of communication can be improved, and the security can be improved.

Next, the data collection/analysis apparatus 102 generates an encryption key and a decryption key based on the measurement parameter (S202). For example, a hash value calculated using a hash function in which the measurement parameter is an argument may be used as the encryption key. In addition, a public key and a secret key may be generated by public-key cryptography and the public key may be transmitted to the wireless sensor node 101.

Next, the data collection/analysis apparatus 102 transmits the generated encryption key and the measurement parameter to the wireless sensor node 101 at a predetermined timing (in a time zone in which the wireless sensor node 101 waits for a radio signal) (S203).

Next, in the wireless sensor node 101, the processor 8 executes setting using the received measurement parameter and stores the received encryption key in the memory (S204).

The wireless sensor node 101 enters a sleep mode until a timing of measurement by the vibration sensor 2 is reached (S205), releases the sleep mode when the measurement timing is reached (S206), and executes the measurement by the vibration sensor 2 (S207).

Next, the wireless sensor node 101 encrypts the sensor data using the encryption key stored in the memory and generates transmission data (S208). For correction during decryption in the data collection/analysis apparatus 102 on the reception side, a check code during encryption may be added. The check code may be a fixed value or a checksum of the sensor data. For the encryption in Step S208, a simple method having a small number of operations and low power consumption, for example, addition, multiplication, or XOR operation may be adopted. The encryption in Step S208 may be executed by the processor 8 executing a program. Hardware for cryptographic calculation built in an integrated circuit (for example, a microcomputer) may be used.

Next, the wireless sensor node 101 transmits the generated data (S209).

The data collection/analysis apparatus 102 decrypts the data transmitted from the wireless sensor node 101 (S210). Next, the data collection/analysis apparatus 102 determines whether or not the data can be correctly decrypted (S211). For example, the data collection/analysis apparatus 102 can determine whether or not the decryption result is correct using the check code included in the data during the encryption. When the decryption result is correct, it is determined that the measurement parameter is correctly set, and the decrypted data is stored in the memory 202 (S212).

On the other hand, when the check code is not correctly decrypted, it is determined that the measurement parameter is not correctly set, and the received sensor data is discarded without being stored in the memory 202 (S213). Next, returning to Step S201, the measurement parameter is calculated (S201), the encryption key and the decryption key are generated (S202), and the encryption key and the measurement parameter are transmitted to the wireless sensor node 101 (S203). The calculation of the measurement parameter in Step S201 may be optionally executed. For example, when the same measurement parameter is set again, the encryption key and the measurement parameter may be transmitted to the wireless sensor node 101 in Step S203.

As described above, according to the embodiment of the present invention, the data collection/analysis apparatus 102 (data collection apparatus) generates an encryption key using a measurement parameter set in the wireless sensor node 101 (sensor node) and transmits the measurement parameter and the generated encryption key to the wireless sensor node 101; the wireless sensor node 101 encrypts the sensor data measured by the sensor device using the received encryption key according to the received measurement parameter and transmits the encrypted sensor data to the data collection/analysis apparatus 102; and the data collection/analysis apparatus 102 decrypts the sensor data received from the wireless sensor node 101, stores the decrypted sensor data in the memory 202 (storage unit) when the sensor data is normally decrypted, and discards non-decrypted sensor data and transmits the measurement parameter to the wireless sensor node 101 when the sensor data is not normally decrypted. Therefore, the measurement parameter can be reliably changed while reducing the power consumption of the wireless sensor node 101. That is, the measurement parameter can be verified based on the decryption result of the sensor data, and the measurement parameter can be set in the wireless sensor node 101 again when the data is not correctly decrypted. Therefore, without providing a special sequence for checking the measurement parameter, it can be verified that the measurement is executed according to the measurement parameter set from the data collection/analysis apparatus 102, and correct data can be collected.

In addition, the sensor data is encrypted and transmitted. Therefore, the interception or impersonation of the sensor data can be prevented, and the security can be improved. In addition, every time the measurement parameter is updated, a new encryption key is generated. Therefore, the encryption key is periodically updated, and thus high security can be provided. In addition, the encryption key requiring high power consumption is generated on the data collection/analysis apparatus 102 side having no restriction on power supply, and the wireless sensor node 101 executes only encryption using multiplication or the like. Therefore, the calculation amount can be suppressed, and the power consumption can be reduced.

In addition, the wireless sensor node 101 includes the amplifier circuit 6 that amplifies the sensor data measured by the sensor device (for example, the vibration sensor 2), in which an operation of the amplifier circuit 6 is controlled according to the measurement parameter transmitted from the data collection/analysis apparatus 102. By controlling the operation of the portion having high power consumption, the power consumption of the wireless sensor node 101 can be effectively reduced.

In addition, the wireless sensor node 101 includes a power supply employing energy harvesting (for example, a solar battery, vibration power generation, thermal power generation, cranked power generation). Therefore, it is not necessary to supply commercial power, and large-scale installation is possible by operating the wireless sensor node 101 using a stand-alone power supply.

In addition, the data collection/analysis apparatus 102 generates the encryption key using the hash function. Therefore, the encryption key can be generated with a small calculation amount.

The present invention is not limited to the embodiment and includes various modification examples and identical configurations within the scope of the appended claims. For example, the embodiments have been described in detail in order to easily describe the present invention, and the present invention is not necessarily to include all the configurations described above. In addition, some of the configurations of one embodiment may be replaced with the configurations of another embodiment. In addition, some of the configurations of one embodiment may be added to the configurations of another embodiment. In addition, addition, deletion, and replacement of another configuration can be made for a part of the configuration each of the embodiments.

In addition, some or all of the above-described respective configurations, functions, processing units, processing means, and the like may be implemented by hardware, for example, by designing an integrated circuit. In addition, the respective configurations, functions, and the like may be realized by software by a processor interpreting and executing a program that realizes each of the functions.

Information of a program, a table, a file, or the like that implements each of the functions can be stored in a storage device such as a memory, a hard disk, or an SSD (Solid State Drive) or a recording medium such as an IC card, an SD card, or a DVD.

In addition, the drawings illustrate control lines or information lines as considered necessary for explanations but do not illustrate all control lines or information lines required on the actual production line. It can be considered that almost of all components are actually interconnected.

What is claimed is:

1. A sensor system that collects data, the sensor system comprising:

a sensor node that collects data; and
a data collection apparatus that is wirelessly connected to the sensor node,
the sensor node including:
    a sensor device that measures a physical quantity including vibration of a measurement target;
    a controller that encrypts sensor data measured by the sensor device;
    a communication unit that transmits and receives data to and from the data collection apparatus,
the data collection apparatus including:
    an arithmetic unit that executes a process in a predetermined order;
    a storage unit that is connected to the arithmetic unit; and
    a communication unit that transmits and receives data to and from the sensor node,
the data collection apparatus being configured to:
    generate an encryption key using a measurement parameter set in the sensor node; and
    transmit the measurement parameter and the generated encryption key to the sensor node,
the sensor node being configured to:
    enter a sleep mode until a time for measurement by the sensor device is reached, exit the sleep mode when the time for the measurement is reached, and execute the measurement by the sensor device;
    encrypt the sensor data measured by the sensor device using the received encryption key according to the received measurement parameter; and
    transmit the encrypted sensor data to the data collection apparatus, and
the data collection apparatus being configured to:
    decrypt the sensor data received from the sensor node;
    store the decrypted sensor data in the storage unit when the sensor data is normally decrypted; and
    discard non-decrypted sensor data and transmits the measurement parameter and the encryption key to the sensor node when the sensor data is not normally decrypted.

2. The sensor system according to claim 1, wherein
the sensor node includes an amplifier circuit that amplifies the sensor data measured by the sensor device, and
the sensor node controls an operation of the amplifier circuit according to the measurement parameter transmitted from the data collection apparatus.

3. The sensor system according to claim 1, wherein
the sensor node includes a power supply employing energy harvesting.

4. The sensor system according to claim 1, wherein
the data collection apparatus generates the encryption key using a hash function.

5. A data collection apparatus that is wirelessly connected to a sensor node collecting data, the apparatus comprising:
an arithmetic unit that executes a process in a predetermined order;
a storage unit that is connected to the arithmetic unit; and
a communication unit that transmits and receives data to and from the sensor node, the data including vibration data of a measurement target, wherein
    an encryption key is generated using a measurement parameter set in the sensor node,
    the measurement parameter and the generated encryption key are transmitted to the sensor node,
    the sensor node enters a sleep mode until a time for measurement by the sensor device is reached, exits the sleep mode when the time for the measurement is reached, and executes the measurement by the sensor device;
    sensor data encrypted by the sensor node using the encryption key is decrypted,
    the decrypted sensor data is stored in the storage unit when the sensor data is normally decrypted, and
    non-decrypted sensor data is discarded and the measurement parameter and the encryption key are transmitted to the sensor node when the sensor data is not normally decrypted.

6. The data collection apparatus according to claim 5, wherein
the sensor node includes an amplifier circuit that amplifies the measured sensor data, and
the data collection apparatus transmits a measurement parameter for controlling an operation of the amplifier circuit.

7. The data collection apparatus according to claim 5, wherein
the encryption key is generated using a hash function.

8. A data collection method in which a sensor system collects data,
the sensor system including a sensor node that collects data and a data collection apparatus that is wirelessly connected to the sensor node,
the sensor node including a sensor device that measures a physical quantity including vibration of a measurement target, a controller that encrypts sensor data measured by the sensor device, a communication unit that transmits and receives data to and from the data collection apparatus, and a reception unit that receives a signal transmitted from the data collection apparatus, and
the data collection apparatus including an arithmetic unit that executes a process in a predetermined order, a storage unit that is connected to the arithmetic unit, and a communication unit that transmits and receives data to and from the sensor node,
the data collection method comprising:
    allowing the data collection apparatus to generate an encryption key using a measurement parameter set in the sensor node;
    allowing the data collection apparatus to transmit the measurement parameter and the generated encryption key to the sensor node;
    allowing the sensor node to enter a sleep mode until a time for measurement by the sensor device is reached, exit the sleep mode when the time for the measurement is reached, and execute the measurement by the sensor device;
    allowing the sensor node to encrypt the sensor data measured by the sensor device using the received encryption key according to the received measurement parameter;
    allowing the sensor node to transmit the encrypted sensor data to the data collection apparatus;
    allowing the data collection apparatus to decrypt the sensor data received from the sensor node;
    allowing the data collection apparatus to store the decrypted sensor data in the storage unit when the sensor data is normally decrypted; and
    allowing the data collection apparatus to discard non-decrypted sensor data and to transmit the measurement parameter and the encryption key to the sensor node when the sensor data is not normally decrypted.

9. The data collection method according to claim 8, wherein the data collection apparatus includes an amplifier circuit that amplifies the sensor data measured by the sensor device, and the data collection method further includes allowing the data collection apparatus to control an operation of the amplifier circuit according to the measurement parameter transmitted from the data collection apparatus.

10. The data collection method according to claim 8, further comprising:

allowing the data collection apparatus to generate the encryption key using a hash function.

\* \* \* \* \*